(12) United States Patent
Gloisten

(10) Patent No.: US 6,402,610 B1
(45) Date of Patent: Jun. 11, 2002

(54) POSITIVE SHUT-OFF AIR OUTLET

(75) Inventor: Jennifer L. Gloisten, Farmingville, NY (US)

(73) Assignee: Aerospace Lighting Corp., Holbrook, NY (US)

( * ) Notice: Subject to any disclaimer, the term of this patent is extended or adjusted under 35 U.S.C. 154(b) by 0 days.

(21) Appl. No.: 09/863,084

(22) Filed: May 22, 2001

(51) Int. Cl.[7] ............................................ F24F 13/065
(52) U.S. Cl. ........................................ 454/76; 454/286
(58) Field of Search ................................ 454/154, 286, 454/76

(56) References Cited

U.S. PATENT DOCUMENTS

| | | | |
|---|---|---|---|
| 2,596,869 A | * 5/1952 | Ross | 222/507 |
| 2,672,806 A | 3/1954 | Vehige | |
| 2,885,943 A | 5/1959 | Divizia | |
| 3,238,861 A | 3/1966 | Fromme | |
| 3,690,244 A | * 9/1972 | Kallel et al. | 200/61.86 |
| 3,802,328 A | 4/1974 | Kakizaki | |
| 3,835,759 A | * 9/1974 | Lloyd | |
| 4,092,907 A | 6/1978 | Meyer et al. | |
| 4,454,893 A | 6/1984 | Orchard | |
| 5,328,152 A | 7/1994 | Castle | |
| 5,342,028 A | 8/1994 | Nevrekar | |
| 5,399,119 A | 3/1995 | Birk et al. | |
| 5,967,891 A | 10/1999 | Riley et al. | |

FOREIGN PATENT DOCUMENTS

| | | | |
|---|---|---|---|
| DE | 662360 | * 7/1938 | 454/286 |
| JP | 60-256747 | * 12/1985 | 454/154 |

* cited by examiner

*Primary Examiner*—Harold Joyce
(74) *Attorney, Agent, or Firm*—Collard & Roe, P.C.

(57) ABSTRACT

A positive shut-off air outlet comprises a nozzle having an internal surface with a spherical radius of curvature, a disc mounted within the nozzle having an external surface with a spherical radius of curvature adapted to interface with the internal surface of the nozzle, and a plurality of axle pins disposed in the external surface of the disc preferably extending beyond the external surface of the nozzle. A seal may also be provided encircling the nozzle in a space between the nozzle and a ball housing in which the nozzle is rotatably mounted at a point where the axle pins extend. The seal is adapted to rotate with the nozzle inside the ball housing. The disc is mounted for rotation and longitudinal movement within the nozzle between open positions permitting air flow and a closed position preventing air flow. The axle pins are received within axle openings disposed in the surface of the nozzle. Each axle opening is dimensioned to permit longitudinal movement of a respective axle pin and the disc in the nozzle. When the disc is in the closed position, air flow causes longitudinal movement of the disc against the nozzle so that the external surface of the disc interfaces with the internal surface of the nozzle to form an air flow seal.

15 Claims, 12 Drawing Sheets

POSITIVE SHUT-OFF AIR OUTLET

BACKGROUND OF THE INVENTION

1. Field of the Invention

The present invention relates to air control valves and more particularly to a positive shut-off air outlet suitable for use in aviation applications.

2. The Prior Art

Air outlets used as passenger and pilot amenities in general aviation provide for air flow at relatively low back pressure compared to those used in commercial aviation. This class of products has suffered from the lack of an effective sealing mechanism and depends on low back pressure to keep leakage levels acceptable. Normal tolerance variation of the components together with the application of surface finish further reduces the manufacturing yield and performance of these air outlets in the closed position.

Products currently available usually employ a "butterfly" or "disc type" valve in which a disc with rounded edges rotates within a nozzle. The best seal is achieved when the disc is matched to the nozzle in size, the axle pins are exactly at their design location, and axle pin holes in the nozzles are also perfectly placed. As the disc varies smaller or the nozzle larger, the air outlet suffers increased leakage. If the variation is reversed, the outlet cannot be assembled. When hole or pin locations vary, the outlet may not close completely.

SUMMARY OF THE INVENTION

A positive shut-off air outlet is provided for use, for example, as a passenger or pilot amenity in general aviation, which allows for a contact shut off of the air outlet. The outlet also decreases the dependence on tight design tolerances and improves reliability for closed performance as well as manufacturability.

The outlet includes a nozzle having an internal surface with a spherical radius of curvature and axle openings disposed in the internal surface. A disc is mounted for rotation and longitudinal movement within the nozzle. The disc has an external surface with a spherical radius of curvature adapted to interface with the internal surface of the nozzle. A plurality of axle pins are disposed in the external surface of the disc. Preferably, the nozzle has an external surface and is rotatably mounted within a ball housing, the axle pins extend beyond the external surface of the nozzle, and a seal encircles the nozzle and the ball housing at a point where the axle pins extend. A seal between the ball housing and a mounting flange may also be provided. The disc is mounted for rotation and longitudinal movement between open positions permitting air flow and a closed position preventing air flow. In the closed position, air flow causes longitudinal movement of the disc against the nozzle so that the external surface of the disc interfaces with the internal surface of the nozzle to form an air flow seal. Preferably, an actuator coupled to the disc rotates the disc between any of the open positions and the closed position.

The ball housing preferably has two diametrically opposed longitudinal slots in the back edge of the ball housing. The disc preferably has an outside radius and an edge radius equal to or slightly smaller than the internal spherical radius of the nozzle. Preferably, the nozzle has an exit end with a spherical internal surface that provides a smaller diameter than that of the remainder of the nozzle.

Each axle pin is received within a respective axle opening disposed in the internal surface of the nozzle. Each axle opening is dimensioned to permit longitudinal movement of a respective axle pin and the disc in the nozzle.

Both seals are preferably formed from polymerized tetrafluoroethylene (Teflon) and are adapted to rotate with the nozzle inside the ball housing.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Turning now in detail to the drawings, FIGS. 1–6 show a positive shut-off air outlet 10 of a preferred embodiment in association with a spherical ball housing, with the standard disc actuating system and flange omitted in FIGS. 1–4 for clarity. Outlet 10 preferably comprises a spherical ball housing 20 (FIG. 10), a disc 30 (FIG. 8), a plurality of axle pins 40 disposed in disc 30 and a rotatable tubular nozzle 50 (FIG. 7). Preferably, a seal 60 (FIG. 9) encircles nozzle 50 in a space 70 (FIGS. 1C and 3C) between nozzle 50 and ball housing 20 at a point where axle pins 40 extend. Preferably, ball housing 20, disc 30 and nozzle 50 are fabricated from machined aluminum or molded plastic, and seal 60 from polymerized tetrafluoroethylene (Teflon) or equivalent material. Outlet 10 may be designed so that it may be provided within the outlines of conventional products, and if required may serve as a drop in replacement.

Figure 3A:
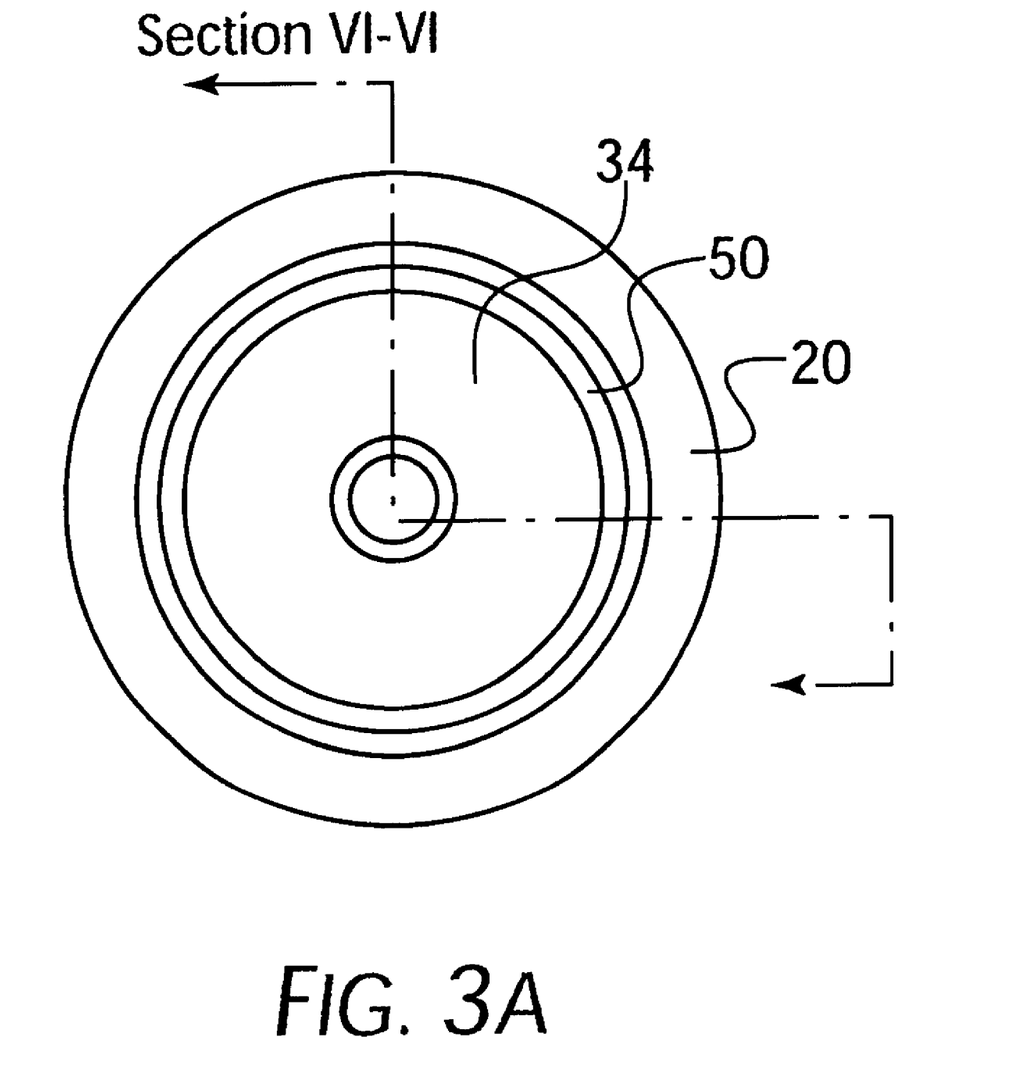
FIG. 3A is a front view of the embodiment shown in FIGS. 1A–1C, with the outlet in the closed position.
Figure 3B:
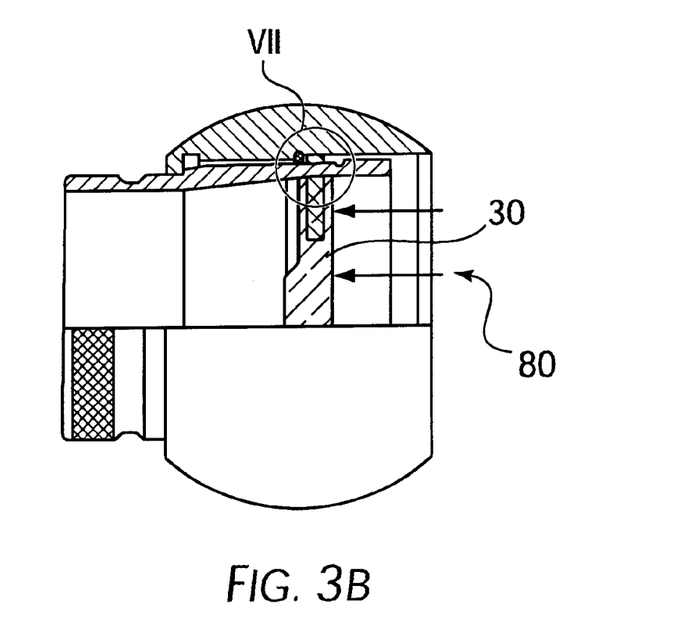
FIG. 3B is a sectional view along line VI—VI of FIG. 3A.
Figure 3C:
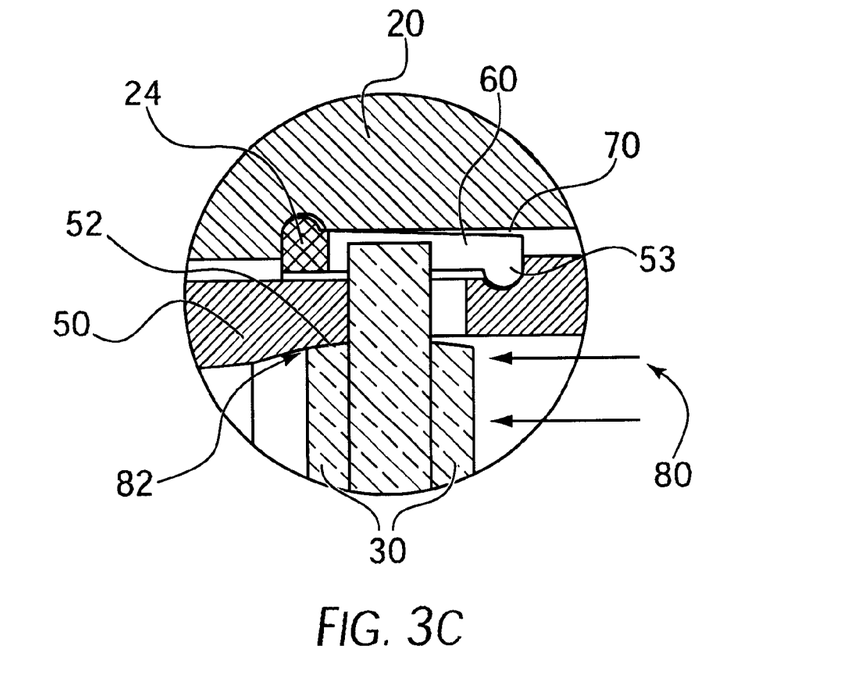
FIG. 3C is an enlarged view of area VII of FIG. 3B.
Figure 8A:
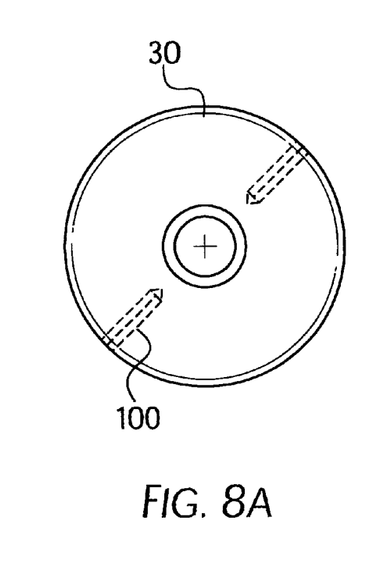
FIG. 8A is a top view of the disc of the embodiment shown in FIGS. 1A–1C.
Figure 8B:
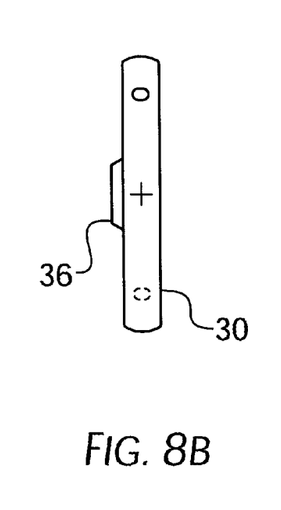
FIG. 8B is a side view of the disc of FIG. 8A.
Figure 8C:
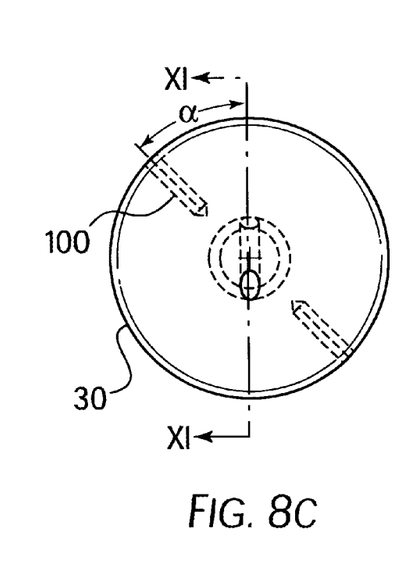
FIG. 8C is a bottom view of the disc of FIG. 8A.

The disc and nozzle structure of air outlet 10 performs like a ball in a socket in contrast with conventional designs using a disc in a tube. Disc 30 preferably has an edge radius equal to its outside radius, achieving the shape of a slice from a sphere. In other words, the radius of curvature of disc 30 at the top and bottom edges, when viewed at its side, as shown in FIG. 8B, is equal to the radius of curvature along the circumference of disc 30 when viewed from the top as shown in FIG. 8A. Nozzle 50 has an area 52 whose internal spherical radius is equal to or greater than, preferably slightly greater than the radius of disc 30 plus a minimal clearance 54 as shown in FIGS. 1C and 3C. The diameter of nozzle 50 is reduced toward its exit end 58. Air flow 80 is resisted by contact between disc 30 and nozzle 50 in area 82. Any leakage around disc 30 encounters a minimal flow path comprising the small space between concentric spherical surfaces. In this arrangement, the greater the back pressure exerted by the air, the better the disc seats in the nozzle, and therefore the the resistance to air leakage. This arrangement is in contrast to existing products which provide a barrier to flow only in a line along the outer edge where it is closest to the cylindrical nozzle. In this existing design, the gap is necessary to prevent interference, to allow movement of the disc, and to accommodate manufacturing tolerances. In this existing design, leakage is a function of back pressure. In better such products, the disc curves back quickly to a wide flow area of less resistance.

Figure 8D:
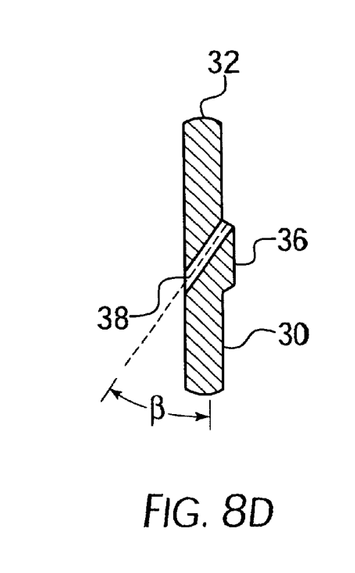
FIG. 8D is a sectional view along line XI—XI of FIG. 8C.

As shown in FIGS. 8A–8D, disc 30 is an integral body formed from machined aluminum or molded plastic and includes a protuberance 36 through which a passage 38 extends at an oblique angle, β, for example, 36° relative to the vertical as shown in FIG. 8D. Passage 38 is adapted to receive actuator pin 98 in order to effect rotation of disc 30 between one or more open positions and a closed position. Preferably, passage 100 is adapted to receive axle pins 40 disposed on opposite sides of disc 30 at an angle α, for example, 45° relative to passage 38.

Nozzle 50, shown in FIGS. 7A and 7B, has diametrically opposed axle openings shown as slots 56 adapted to receive axle pins 40 which pass through slots 56 and extend beyond the outer surface of nozzle 50. Each axle slot 56 is sufficiently large to allow an axle pin 40 to float loose inside slot 56. The free moving pins 40 permit disc 30 to center itself in a position where it contacts radiused portion 52 of nozzle 50. This arrangement significantly reduces disc to nozzle leakage because the sealing surfaces always move to touch each other under the air pressure 80 behind air outlet 10.

With disc 30, shown in FIGS. 8A–8D, positioning itself for best fit, the tolerances on hole and pin placement are no longer critical. By careful selection of spherical radii for disc 30 and nozzle 50, requirements for accurate diameters are also relieved. Thus it is no longer necessary to achieve accurate dimensions throughout extensive surface finishing operations. The floating axles 40 also eliminate problems with valves that stick in the closed position or are not able to close.

Figure 9A:
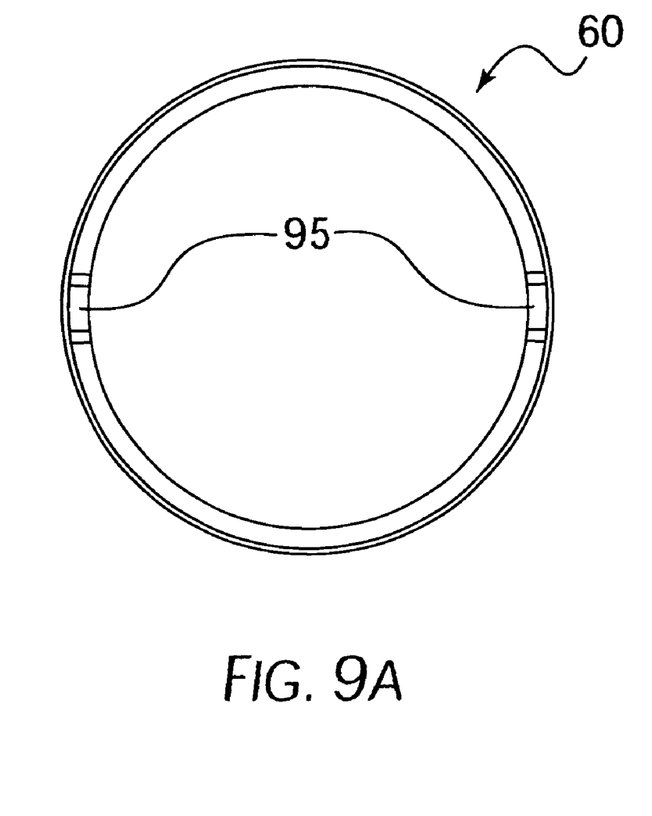
FIG. 9A is a top view of the nozzle/ball housing seal of the embodiment shown in FIGS. 1A–1C.
Figure 9B:
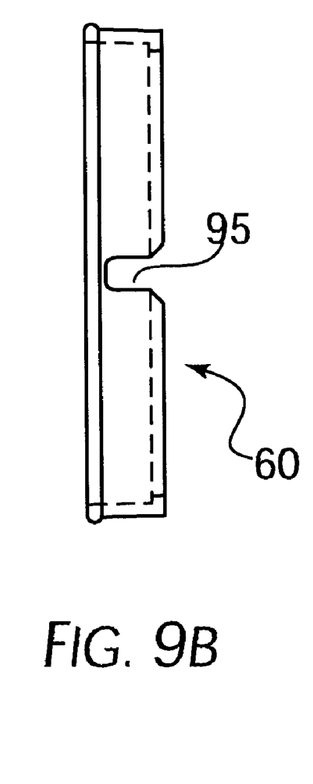
FIG. 9B is a side view of the nozzle/ball housing seal of FIG. 9A.

Preferably, cylindrical seal 60, shown in FIGS. 9A and 9B, stabilizes axle pins 40 in nozzle slots 56 such that they do not rattle when air outlet 10 is open. As shown in FIG. 1C, pins 40 preferably extend beyond the outer surface 51 of nozzle 50 with the outside ends 42 of pins 40 leaning against seal 60. During operation to open or close air outlet 10, seal 60 rotates with nozzle 50 inside ball housing 20. Preferably, as shown in FIGS. 9A and 9B, seal 60 has notches 95 which are adapted to accept the extended axle pins 40 which drive the rotation of seal 60 with nozzle rotation.

Cylindrical seal 60 encircles nozzle 50 in space 70 between nozzle 50 and ball housing 20. As shown in FIGS. 1B and 1C, outer surface 51 of nozzle 50 has a step 53 forming a channel 55 which is designed to mate with seal 60. Inner surface 22 of ball housing 20 similarly has a step 24 forming a channel 26 which is designed to mate with seal 60. Seal 60 has a first extension 62 at end 64 of seal 60 which is adapted to be received in nozzle channel 55 and a second extension 66 at end 68 of seal 60 which is adapted to be received in ball housing channel 26. Seal ends 64 and 68 provide the contact surfaces rather than the internal and external walls of seal 60. As stated previously, seal 60 is preferably formed from polymerized tetrafluorethylene (Teflon) which contributes to smooth and consistent resistance during opening and closing of air outlet 10. In this embodiment, the leak resistant seal improves with time and wear compared with the performance deterioration with time and wear of conventional designs. By providing extensions 62 and 66 into nozzle channel 55 and ball housing channel 26 respectively, seal 60 functions even when a user presses on the end of nozzle 50.

Current designs rely on a seal created by lubricant between two finished, metal surfaces. The lubricant often becomes visible at the front of these products, and will migrate out from the surface interface over time, reducing the ability of the seal to prevent air leakage.

Figure 10A:
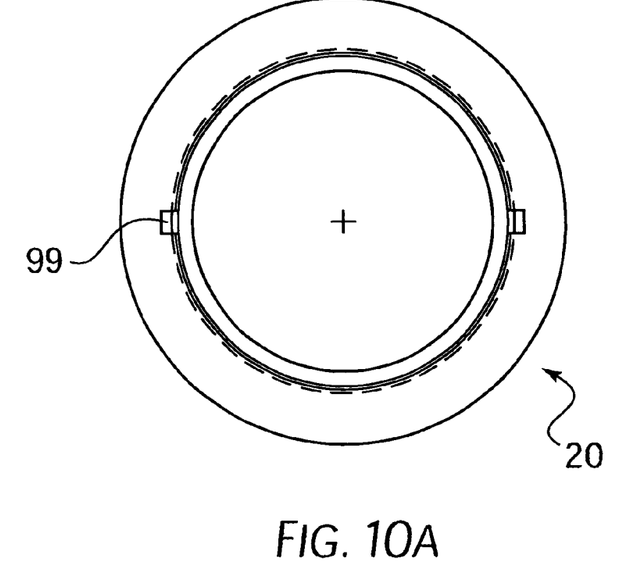
FIG. 10A is a top view of the ball housing of the embodiment shown in FIGS. 1A–1C.
Figure 10B:
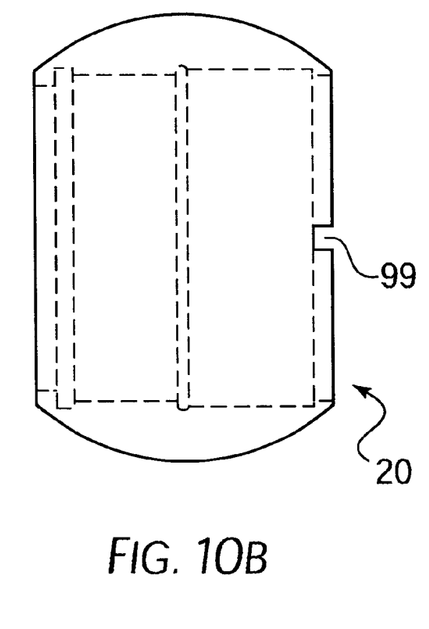
FIG. 10B is a side view of the ball housing of FIG. 10A.

Long axle pins 40 are preferably used in air outlet 10 to benefit manufacturability. Currently disc/nozzle assemblies cannot be disassembled for rework. Because conventional pins used in such assemblies end flush with the nozzle surface, there is no way to grip them for removal without damaging or distorting the nozzle. In contrast, long axle pins 40 in air outlet 10 as shown in FIG. 1C extend sufficiently far to allow gripping for removal and subsequent rework of the disc and nozzle components. Preferably, at the back edge of ball housing 20, as shown in FIGS. 10A and 10B, two diametrically opposed longitudinal loading slots 99 interrupt the locking ring shelf, allowing pins 40 to pass into ball housing 20.

The ball housing is mounted within flange 90. A felt ring 92, compressed by a plurality of angle springs 91, encircles ball housing 20 and secures it within flange 90. A seal 93 preferably formed from polymerized tetrafluorethylene (Teflon) is positioned next to compressible felt ring 92 in the flange, sealing off the flow of air between the ball housing 20 and flange 90.

Figure 5:
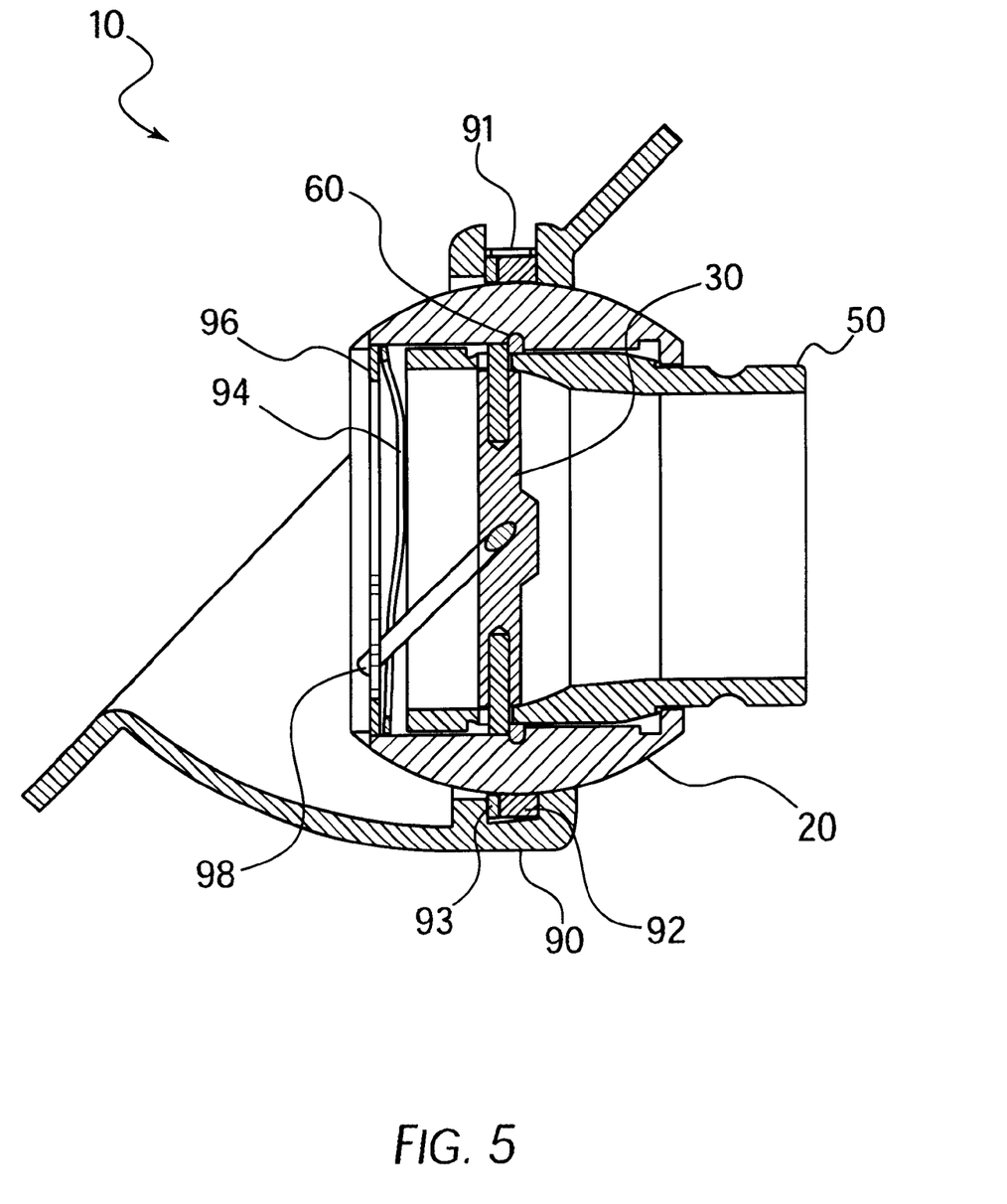
FIG. 5 is a section view of the embodiment shown in FIGS. 1A–1C with the standard disc actuating system and flange removed.
Figure 6:
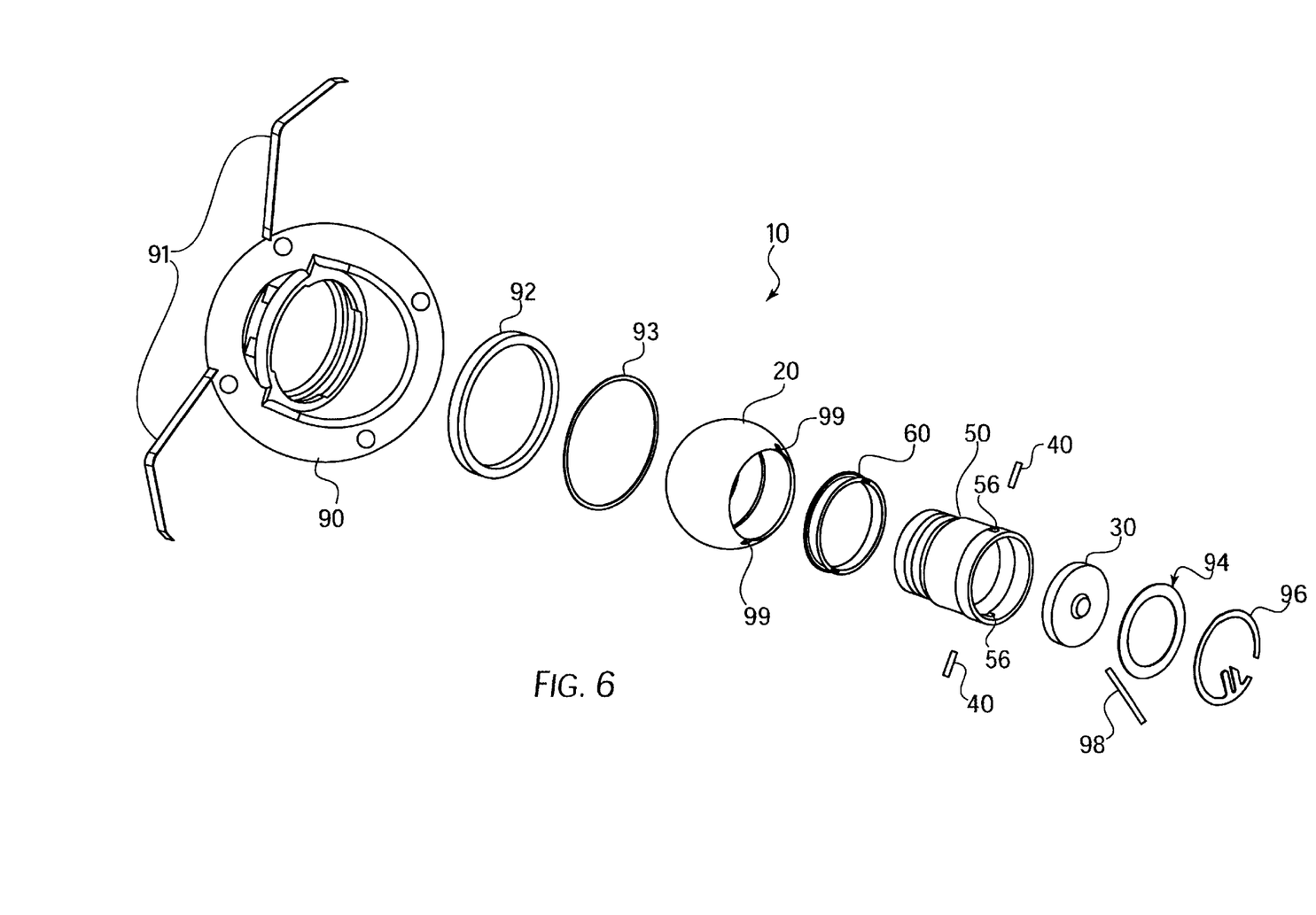
FIG. 6 is an exploded perspective view of the embodiment shown in FIG. 5.
Figure 7A:
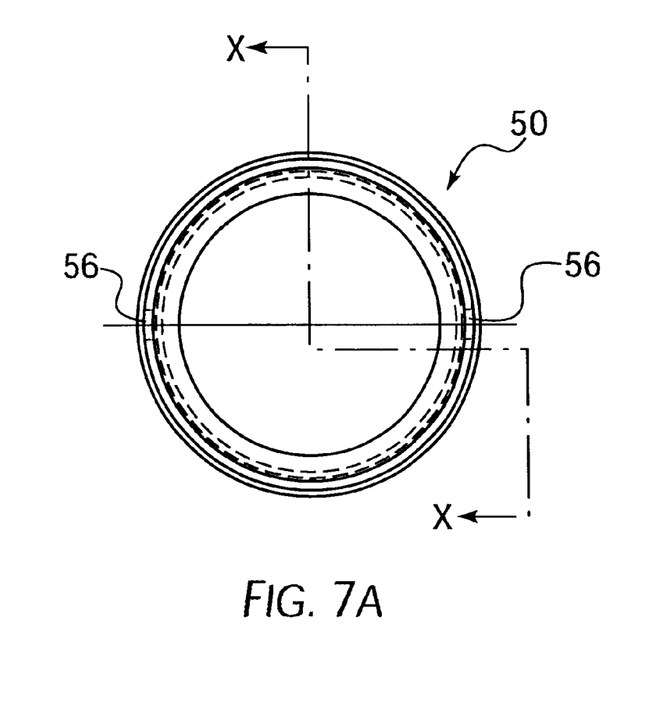
FIG. 7A is a top view of the nozzle of the embodiment shown in FIGS. 1A–1C.
Figure 7B:
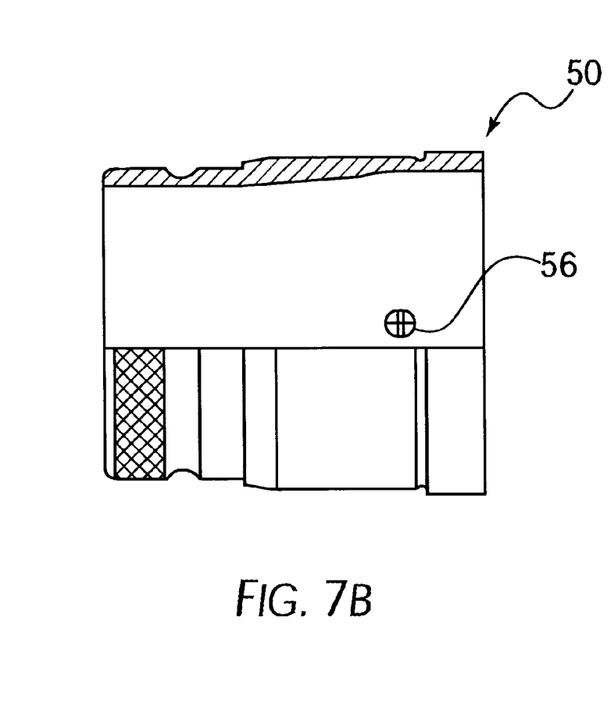
FIG. 7B is a sectional view along line X—X of FIG. 7A.

As shown in FIGS. 5 and 6, a standard disc actuating system and flange as shown in U.S. Pat. No. 2,596,869 are used in the air outlet. Flange 90 is mounted to a supporting structure in a typical environment of use namely with flange 90 installed above or on an apertured panel (not shown) and with the output end of nozzle 50 extending beyond the panel aperture to permit access to the nozzle. The interior of flange 90 is operatively connected with a source (not shown) of ventilating air. Flange 90 is configured to captively retain ball housing 20 and the disc and nozzle structure therein. Flange 90 is equipped with an annular felt seal 92 and an additional seal 93 located adjacent to the felt, nearer to the back open end of flange 90. An actuator 96 is mounted within nozzle 50. A wave washer 94 may be included between the nozzle 50 and the actuator 96 at the output end of nozzle 50. Actuator pin 98 extends through a slot in actuator 96 to contact and rotate disc 30 between one or more open positions and a closed position.

Figure 1A:
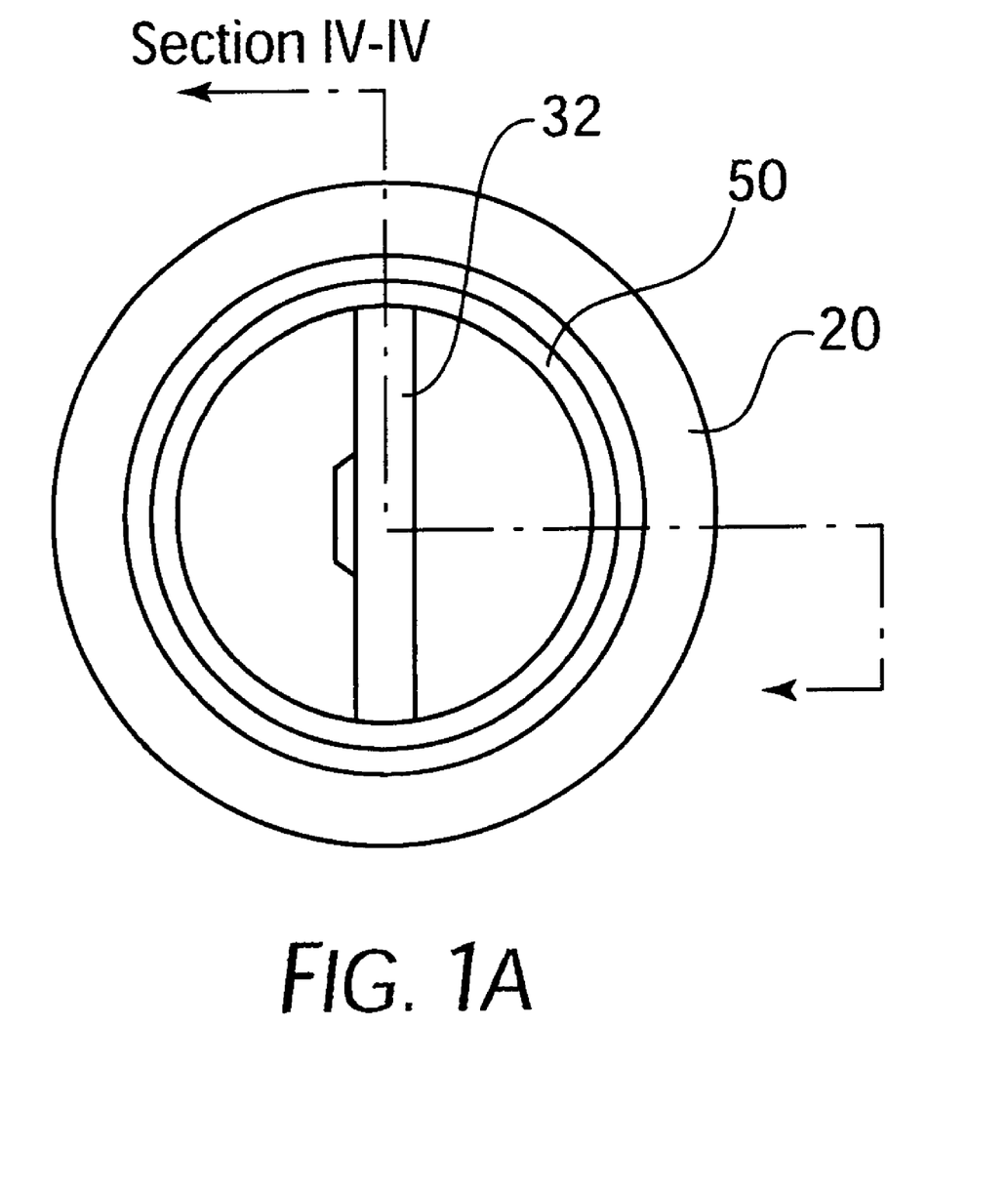
FIG. 1A is a front view of an embodiment of the present invention, with the outlet in the open position, with the standard disc actuating system and flange omitted for clarity.
Figure 1B:
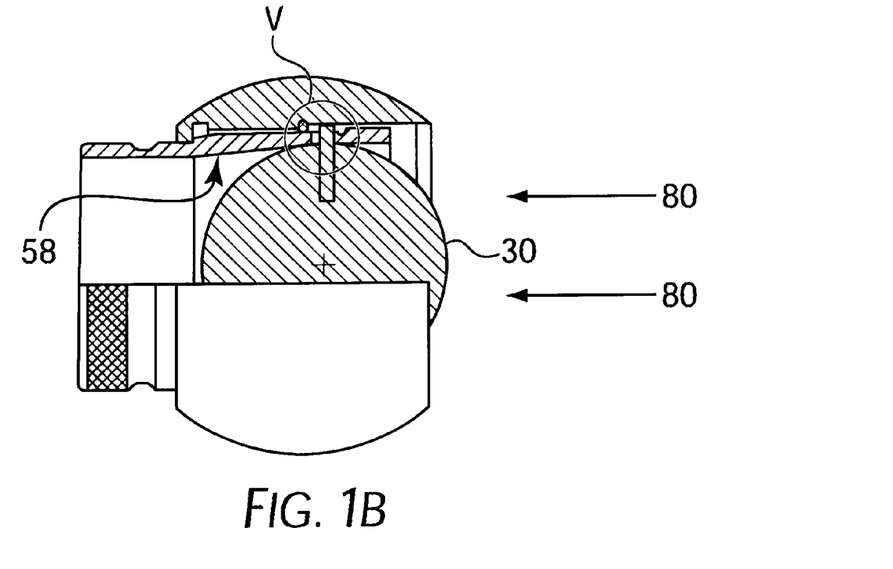
FIG. 1B is a sectional view along line IV—IV of FIG. 1A.
Figure 1C:
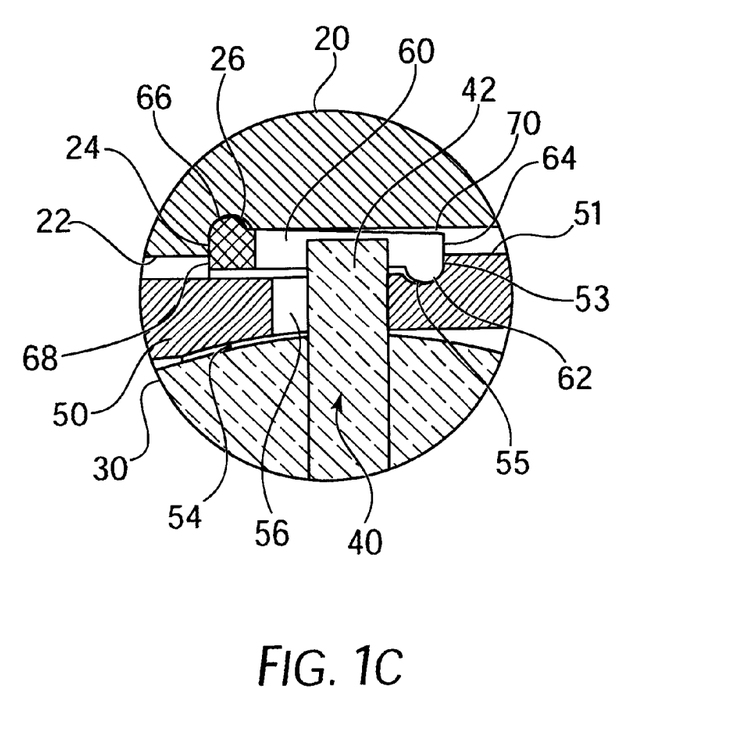
FIG. 1C is an enlarged view of area V of FIG. 1B.
Figure 2A:
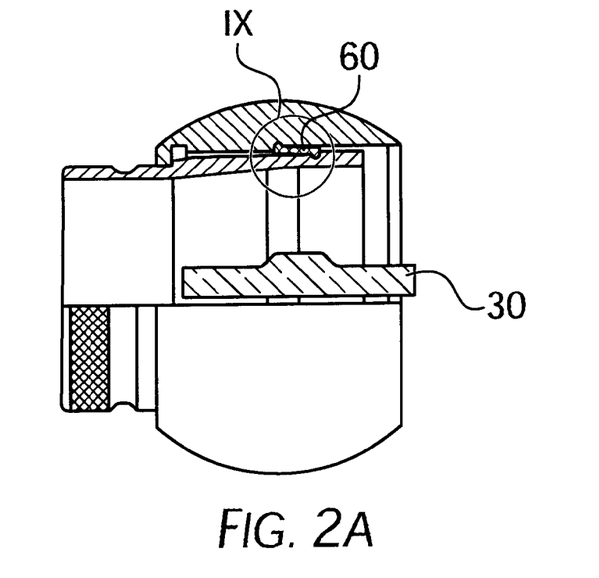
FIG. 2A is an alternate section view of the embodiment shown in FIGS. 1A–1C.
Figure 2B:
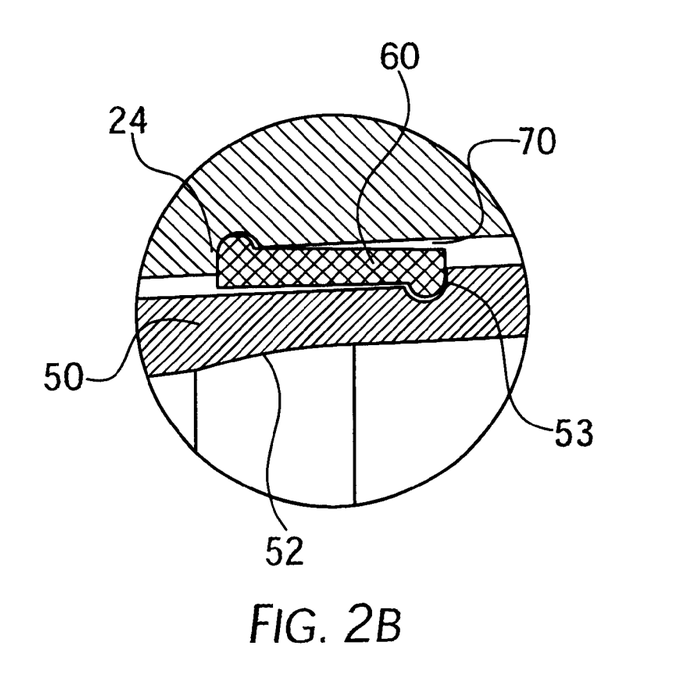
FIG. 2B is an enlarged view of area IX of FIG. 2A.

In operation, as shown in FIGS. 1A and 1B, to open air outlet 10, disc 30 is rotated forward so that it is preferably parallel to air flow 80 allowing air to pass through outlet 10. When disc 30 is parallel to air flow 80, the air outlet is fully open; however, partial air flow is achievable when the disc is at a position between parallel and transverse to air flow. When air outlet 10 is closed, disc 30 preferably is transverse to air flow and blocks the path of air as shown in FIGS. 3A and 3B. Seal 60 contacts nozzle 50 at step 53 and contacts ball housing 20 at step 24. As shown in FIG. 3C, a disc to nozzle contact seal forms at 52 where the internal spherical radius of nozzle 50 contacts the radius of disc 30.

Figure 4A:
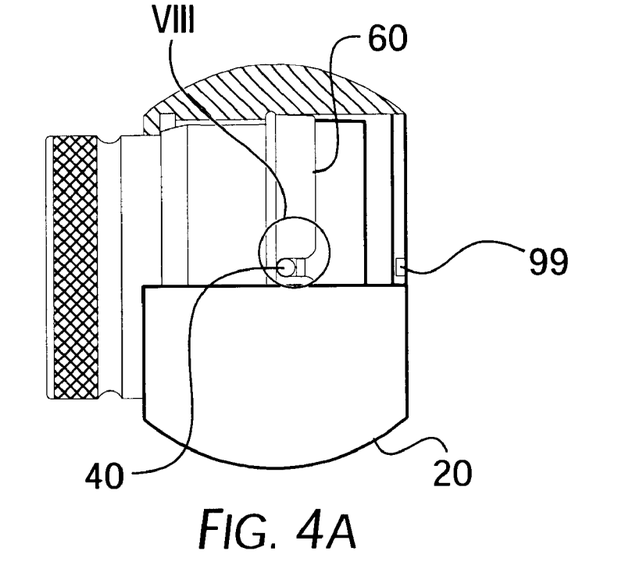
FIG. 4A is a side view of the embodiment shown in FIGS. 1A–1C with a section of the ball housing removed to show the seal.
Figure 4B:
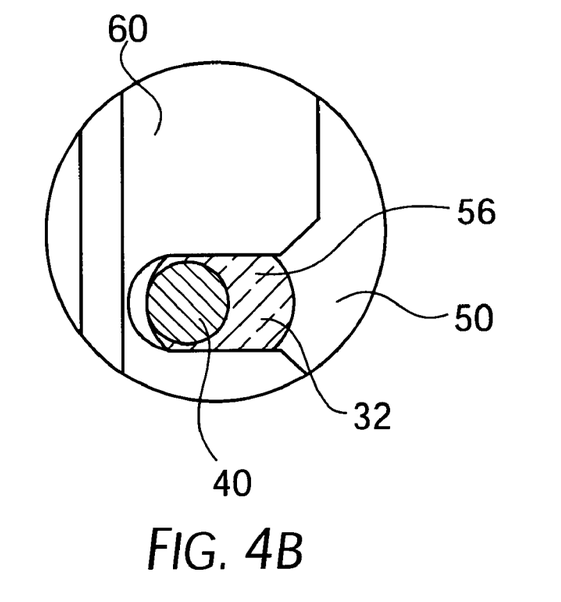
FIG. 4B is an enlarged view of area VIII of FIG. 4A.

FIG. 4A shows air outlet 10 with a section of ball housing 20 removed to show seal 60 and axle pin 40 pointing out of the page. As shown in FIG. 4B, axle pin 40 is received in axle slot 56 in the wall of nozzle 50 with the edge 32 of disc 30 visible through axle slot 56. As shown in FIGS. 1B, 1C, 2A and 2B, when disc 30 is in the open position, seal 60 presses the axle pins 40 against the edges of axle slots 56 to stabilize axle pins 40 against rattling.

While preferred embodiments of the present invention have been shown and described, it is to be understood that many changes and modifications may be made thereunto without departing from the spirit and scope of the invention as defined in the appended claims.

What is claimed is:

1. A positive shut-off air outlet comprising
   (a) a nozzle having
      (i) an internal surface with a spherical radius of curvature, and
      (ii) axle openings disposed in said internal surface;
   (b) a disc mounted for rotation and longitudinal movement within the nozzle between open positions permitting air flow and a closed position preventing air flow, said disc having an external surface with a spherical radius of curvature adapted to interface with the internal surface of said nozzle; and
   (c) a plurality of axle pins disposed in the external surface of the disc, each axle pin received within a respective axle opening in said nozzle, each axle opening being dimensioned to permit longitudinal movement of a respective axle pin and the disc in said nozzle;
   wherein when said disc is in the closed position, air flow causes longitudinal movement of said disc against the nozzle so that the external surface of the disc interfaces with the internal surface of the nozzle to form an air flow seal.

2. The positive shut-off air outlet according to claim 1 wherein:
   (a) the outlet further comprises a ball housing;
   (b) the nozzle has an external surface and is rotatably mounted within the ball housing; and
   (c) the axle pins extend beyond the external surface of the nozzle.

3. The positive shut-off air outlet according to claim 2 further comprising a seal encircling the nozzle in a space between the nozzle and the ball housing at a point where the axle pins extend, said seal adapted to rotate with the nozzle inside the ball housing.

4. The positive shut-off air outlet according to claim 1 further comprising an actuator pin coupled to the disc for rotating the disc between the closed and open positions and to positions between the open and closed positions.

5. The positive shut-off air outlet according to claim 3 wherein the seal between the nozzle and the ball housing comprises polymerized tetrafluoroethylene.

6. The positive shut-off air outlet according to claim 1 wherein the nozzle has an exit end having a smaller diameter than that of the remainder of the nozzle.

7. The positive shut-off air outlet according to claim 3 wherein
   (a) each of the external surface of the nozzle and an inner surface of said ball housing has a channel; and
   (b) said seal has a first extension at one end of said seal adapted to be received in the nozzle channel and a second extension adapted to be received in said ball housing channel.

8. The positive shut-off air outlet according to claim 2 wherein said ball housing has a locking ring shelf and a back edge having two diametrically opposed longitudinal slots interrupting the shelf to allow said axle pins to pass into the ball housing.

9. The positive shut-off air outlet according to claim 5 wherein the polymerized tetrafluoroethylene seal between said ball housing and said nozzle has notches adapted to accept said axle pins, wherein upon rotation of the nozzle, said axle pins rotate said seal within said ball housing.

10. An air outlet assembly comprising:
   (a) a flange adapted for mounting to a supporting structure;
   (b) a ball housing mounted within said flange;
   (c) a compressible annular seal encircling said ball housing and securing said ball housing within said flange;
   (d) a plurality of springs mounted in the flange for compressing said compressible seal;
   (e) a washer positioned next to the compressible seal within said flange;
   (f) a nozzle having an external surface rotatably mounted within said ball housing, said nozzle having
      (i) can internal surface with a spherical radius of curvature, and
      (ii) axle openings disposed in said internal surface;
   (g) a disc mounted for rotation within the nozzle between open positions permitting air flow and a closed position preventing air flow, said disc having an external surface with a spherical radius of curvature adapted to interface with the internal surface of said nozzle;
   (h) a plurality of axle pins disposed in the external surface of said disc, each axle pin received within a respective axle opening in said nozzle, each axle opening being dimensioned to permit longitudinal movement of a respective axle pin and the disc in said nozzle, said pins extending beyond the external surface of the nozzle;
   (i) a seal encircling the nozzle in a space between the nozzle and the ball housing at a point where the axle pins extend, said seal adapted to rotate with the nozzle inside the ball housing;
   (j) an actuator having an actuator slot mounted within the nozzle;
   (k) a wave washer between the nozzle and the actuator; and
   (l) an actuator pin extending through the actuator slot to contact and rotate said disc between the closed and open positions;
   wherein when said disc is in the closed position, air flow causes longitudinal movement of said disc against the nozzle so that the external surface of the disc interfaces with the internal surface of the nozzle to form an air flow seal.

11. The air outlet assembly according to claim 10 wherein the seal between the nozzle and the ball housing comprises polymerized tetrafluoroethylene.

12. The air outlet assembly according to claim 10 wherein the nozzle has an exit end having a smaller diameter than that of the remainder of the nozzle.

13. The air outlet assembly according to claim 10 wherein
  (a) each of the external surface of the nozzle and an inner surface of said ball housing has a channel; and
  (b) said seal has a first extension at one end of said seal adapted to be received in the nozzle channel and a second extension adapted to be received in said ball housing channel.

14. The air outlet assembly according to claim 10 wherein said ball housing has a locking ring shelf and a back edge having two diametrically opposed longitudinal slots interrupting the shelf to allow said axle pins to pass into the ball housing.

15. The air outlet assembly according to claim 11 wherein the polymerized tetrafluoroethylene seal between said ball housing and said nozzle has notches adapted to accept said axle pins, wherein upon rotation of the nozzle, said axle pins rotate said seal within said ball housing.

* * * * *

UNITED STATES PATENT AND TRADEMARK OFFICE
CERTIFICATE OF CORRECTION

PATENT NO. : 6,402,610 B1
DATED : June 11, 2002
INVENTOR(S) : Jennifer L. Gloisten It is certified that error appears in the above-identified patent and that said Letters Patent is hereby corrected as shown below:

<u>Column 6,</u>
Line 40, please change "can" to -- an --.

Signed and Sealed this

Twenty-first Day of January, 2003

JAMES E. ROGAN
*Director of the United States Patent and Trademark Office*